United States Patent
Lippert et al.

(10) Patent No.: US 8,482,854 B2
(45) Date of Patent: Jul. 9, 2013

(54) SAMPLE HOLDER FOR A MICROSCOPE

(75) Inventors: Helmut Lippert, Jena (DE); Benno Radt, Jena (DE); Christopher Power, Jena (DE); Christian Dietrich, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 496 days.

(21) Appl. No.: 12/529,051

(22) PCT Filed: Mar. 26, 2008

(86) PCT No.: PCT/EP2008/002371
§ 371 (c)(1),
(2), (4) Date: Aug. 28, 2009

(87) PCT Pub. No.: WO2008/119490
PCT Pub. Date: Oct. 9, 2008

(65) Prior Publication Data
US 2010/0067104 A1 Mar. 18, 2010

(30) Foreign Application Priority Data
Mar. 29, 2007 (DE) .......................... 10 2007 015 061

(51) Int. Cl.
*G02B 21/26* (2006.01)
*G02B 21/34* (2006.01)
*G01N 21/01* (2006.01)

(52) U.S. Cl.
USPC .......................................... 359/398; 359/381

(58) Field of Classification Search
USPC .......................................... 359/381, 398, 872
See application file for complete search history.

(56) References Cited

U.S. PATENT DOCUMENTS

| 5,680,484 | A  | * | 10/1997 | Ohyama et al. | 382/255 |
| 6,572,327 | B1 | * | 6/2003  | Ball et al.   | 414/816 |
| 7,227,630 | B1 | * | 6/2007  | Zavislan et al. | 356/244 |
| 2004/0076319 | A1 | * | 4/2004 | Fauver et al. | 382/133 |
| 2005/0085721 | A1 | * | 4/2005 | Fauver et al. | 600/425 |

(Continued)

FOREIGN PATENT DOCUMENTS
JP       05304763 A * 11/1993

OTHER PUBLICATIONS

Optics Letters, May 15, 2006, vol. 31, No. 10, pp. 1477-1479, Stelzer et al. "Resolution enhancement in a light-sheet-based microscope (STIM)".

(Continued)

*Primary Examiner* — Stephone Allen
*Assistant Examiner* — Tamara Y Washington
(74) *Attorney, Agent, or Firm* — Frommer Lawrence & Haug LLP (57) ABSTRACT

The invention is directed to a sample holder for a microscope. The sample holder comprises a sample chamber which is filled with an immersion liquid and in which a sample is located. The sample chamber has an upper opening. It further comprises means for translating the sample relative to a detection objective of the microscope, and means for rotating the sample around an axis of rotation extending in a substantially horizontal plane which encloses an angle other than zero degrees with the optical axis of the detection objective. In a sample holder of this kind, the sample is embedded in a transparent embedding medium having at least partially a greater solidity than the immersion liquid. Further, the sample chamber has means for horizontally supporting the embedded sample against the effect of gravity.

18 Claims, 4 Drawing Sheets

U.S. PATENT DOCUMENTS

| | | | |
|---|---|---|---|
| 2006/0096358 A1* | 5/2006 | Fauver et al. | 73/61.72 |
| 2007/0035820 A1* | 2/2007 | Grimes et al. | 359/368 |
| 2007/0109633 A1* | 5/2007 | Stelzer | 359/385 |
| 2010/0134881 A1* | 6/2010 | Lippert et al. | 359/381 |
| 2010/0177381 A1* | 7/2010 | Lippert et al. | 359/398 |
| 2010/0309548 A1* | 12/2010 | Power et al. | 359/385 |
| 2010/0322494 A1* | 12/2010 | Fauver et al. | 382/131 |
| 2011/0122488 A1* | 5/2011 | Truong et al. | 359/385 |

OTHER PUBLICATIONS

Hearing Research 171 (2002) pp. 119-128, Voie "Imaging the intact guinea pig tympanic bulla by orthogonal-plane fluorescence optical secting microscopy".

Stelzer et al., Science 305, 1007 (2004).

Voie et al., J. of Microscopy 170, 229 (1993).

* cited by examiner

SAMPLE HOLDER FOR A MICROSCOPE

The present application claims priority from PCT Patent Application No. PCT/EP2008/002371 filed on Mar. 26, 2008, which claims priority from German Patent Application No. DE 10 2007 015 061.1 filed on Mar. 29, 2007, the disclosure of which is incorporated herein by reference in its entirety.

BACKGROUND OF THE INVENTION

1. Field of the Invention

The invention is directed to a sample holder for a microscope. A sample holder of this kind comprises a sample chamber which is filled with an immersion liquid and in which a sample is located. The sample chamber has an upper opening. Further, the sample holder comprises means for translating the sample relative to a detection objective of the microscope and means for rotating the sample around an axis of rotation extending in a substantially horizontal plane which encloses an angle other than zero degrees with the optical axis of the detection objective.

The sample holder according to the invention can be applied particularly in connection with single plane illumination microscopy (SPIM) and selective plane illumination microscopy. Whereas in confocal laser scanning microscopy the sample is scanned point by point in a plurality of planes at different depths and three-dimensional image information about the sample is obtained from this, the SPIM technique is based on widefield microscopy and makes it possible to generate three-dimensional images of samples based on optical sections through different planes of the sample.

The advantages of SPIM include faster acquisition of images, reduced bleaching out of biological samples, and an expanded depth of penetration of the focus in the sample.

2. Description of Related Art

Basically, in the SPIM technique fluorophores which are contained in the sample or introduced into the sample are excited by laser light which is shaped as a light sheet or which is guided over the sample in such a way that the shape of a light sheet results in effect (i.e., over the period of observation). Each light sheet illuminates a plane in the depth of the sample, and an image of the sample in this plane is obtained by means of this illumination. It is important that elements in the light sheet plane are projected on the detector plane or that the light sheet plane and detector plane are conjugate with respect to one another. In conventional microscope constructions in which the detector plane extends perpendicular to the optical axis of the detection beam path, the direction in which the light is detected is perpendicular or at least virtually perpendicular to the plane of illumination.

SPIM technology is described, for example, in Stelzer et al., *Optics Letter* 31, 1477 (2006), Stelzer et al., *Science* 305, 1007 (2004), DE 102 57 423 A1, and WO 2004/0530558 A1.

The disclosure of these publications includes a sample holder which makes it possible to orient the sample in an optimal manner with a view to obtaining three-dimensional image data from different viewing directions. For this purpose, the sample is embedded in a gel which has been shaped to form a circular cylinder, and this gel cylinder is introduced into a sample chamber filled with an immersion medium, for example, water. The refractive index of the gel must not differ substantially from the refractive index of the surrounding immersion medium.

The gel cylinder enclosing the sample is positioned in the sample chamber in such a way that its axis of rotation extends in the direction of gravitational force, which has advantages for the positioning of the sample in view of the deformability of the gel. It is supported in such a way that it can be displaced in translation and optionally also rotated around its axis of rotation for image recording inside the sample chamber.

The optical axis of the detection objective which collects the detection light coming from the sample is oriented approximately perpendicular to the axis of rotation of the gel cylinder and accordingly does not extend vertically as in the typical microscope construction, but rather horizontally (i.e., perpendicular to the direction of gravitational force).

For image recordings which must be obtained with a large imaging scale and high numerical aperture, detection objectives constructed as immersion objectives are generally used. The immersion objectives project through a wall of the sample chamber into the sample chamber and are sealed at their outer circumference relative to the wall of the sample chamber in order to prevent the immersion medium from running out at the location where the objective penetrates.

A considerable disadvantage of this construction consists in that a special construction of the microscope is required for horizontally aligned detection beam paths because standard microscopes operate with a vertical detection beam path. If other contrast methods besides SPIM are to be used, the special microscope construction must be outfitted correspondingly at increased cost. Further, when immersion objectives are used, it is extremely difficult to change the detection objective because of sealing. A similar construction is described in Voie et al., *Hearing Research* 171, 119 (2002) and in Voie et al., *J. of Microscopy* 170, 229 (1993). Both horizontal and vertical detection beam paths are described. The axis of rotation around which the sample is rotated is aligned horizontally. The rotary drive axle projects laterally into a sample chamber fashioned from polyacetal which also contains the sample and a suitable ambient liquid. The sample is held in the chamber at this axle and is surrounded on all sides by the ambient liquid with the exception of the connection to the axle. The sample chamber is sealed on all sides but can also be open at the top in case of a vertical orientation of the detection beam path. However, the lens of the detection objective does not contact the immersion liquid in this case. A translation of the sample is achieved through movement of the entire chamber. No further details are given with respect to holding the sample with a horizontal axis of rotation.

A sheet-shaped illumination of the sample is also described in U.S. Pat. No. 3,398,634, wherein a conventional microscope stand is used. Rotation of the sample is not described.

U.S. Pat. No. 5,680,484 describes a sample holder in the form of a transparent cylinder which is filled with a liquid and which is held at two locations along its circumference and is set in rotation by a belt drive. However, it is relatively laborious to clamp a glass cylinder of this type in the device and to change the sample in such a glass cylinder. Means for translation of the sample are not described.

SUMMARY OF THE INVENTION

It is the object of the invention to further develop a sample holder of the type described above in such a way that it allows SPIM measurements of a high quality equal to that achieved with a vertical axis of rotation and a horizontal detection beam path, but without the disadvantages of a construction of this kind and without being limited solely to SPIM. In particular, the sample holder can be integrated in a standard microscope stand, which entails a perpendicular detection. Apart from SPIM, contrast methods already established in standard microscopes can also be used. Further, it is possible to change between immersion objectives and dry objectives in a simple manner.

This object is met in a sample holder of the type described above in that the sample is embedded in a transparent embedding medium having a greater solidity than the immersion liquid, and the sample chamber has means for horizontally supporting the embedded sample against the effect of gravity. The embedded sample is not held in the sample chamber as in Voie et al., but rather is supported against the force of gravity, i.e., in the sample chamber, in a corresponding manner, for example, on a bed. In this way, the embedding medium with the sample can be prevented from bending or rupturing so that there is sufficient reproducibility in image recording with rotation.

The embedding medium is preferably made of gel. For example, the gel can be a mixture of 98-99% water and 1%-2% agarose. A gel offers the advantage, for one, that the sample is fixed in this gel so that the sample need not be held directly in a holder and, for another, that the gel can be made in such a way that it has substantially the same refraction characteristics as the surrounding immersion liquid. If water is used as immersion liquid, the above-described gel comprising water and agarose is particularly well suited due to its high proportion of water. A virtually unhindered diffusion is possible in the gel so that another advantage consists in that nutrient can be supplied when living specimens are used. Also, other embedding media such as liquid-filled glass vessels or other transparent vessels can be used.

The embedding medium is advantageously cylindrical, for example, formed as a glass tube or gel cylinder. This regular geometric shape offers the advantage of simple handling particularly with respect to storage and rotation of the sample. Further, there is always the same angle between the interface of the embedding and immersion medium and the light sheet for every rotational position. Other geometries are possible when the different angles for different rotational positions are taken into account.

In another development of the invention, the means for translation comprise a specimen stage which is movable in space and on which the sample chamber is arranged. The sample chamber can be mounted on the specimen stage in a stationary manner, for example. A translation of the sample is then achieved in that the entire sample chamber is moved. The sample in the sample chamber does not move relative to the sample chamber. This is especially advantageous when an image stack must be recorded because greater stability is achieved compared to translation of the sample in the sample chamber. Instead of the stage, the detection objective can also be moved in an equivalent manner and with the same effect.

The means for horizontal support of the sample preferably comprise a horizontal holder which receives the embedded sample. When using a gel cylinder, a tubular shape of the horizontal holder is especially preferred. In this connection, the size of the gel cylinder is adapted to the diameter of the horizontal holder so that the ends of the gel cylinder are enclosed by the horizontal holder virtually in a positive engagement. The horizontal holder in turn is correspondingly supported or is correspondingly supported or held in the sample chamber so as to prevent bending of the gel cylinder. The horizontal holder is preferably constructed in such a way that it can be rotated around the axis of rotation in order to rotate the sample. When the sample—for example, in a gel cylinder—is fixed to or in the horizontal holder, the sample itself can be rotated in this way.

The horizontal holder preferably partially encloses the embedding medium, the embedding medium being supported on a supporting element by its unenclosed area. This construction is particularly advantageous when the embedding medium is symmetrical with respect to rotation because the supporting element can then be designed in a particularly simple manner so that the embedding medium can roll on it. When a gel cylinder is used, for example, it is enclosed by a horizontal holder having a tubular shape, for example, over only 40% of its length. However, when the sample is introduced into the gel cylinder at the free end of the gel cylinder and is not pushed in until the center with respect to the longitudinal axis, the horizontal holder can also enclose a larger area of the gel cylinder, which increases stability. In this case, the supporting element can also be dispensed with under certain circumstances when the enclosed area ensures sufficient stability of the gel cylinder.

The supporting element can advantageously have a contact surface made of Teflon on which the embedding medium is supported. A contact surface of this kind offers the advantage that friction and adhesion are kept extremely low. When a gel cylinder is used, the contact surface can be shaped corresponding to the curvature of this cylinder. When the cylinder is rotated, this cylinder can now roll over the contact surface. Also, plane contact surfaces can be used for purely translational movements. The embedding medium can then be shaped as a cube, for example.

In an alternative construction, the supporting element can also be fashioned from a plurality of rollers on which the embedding medium is supported. When a cylindrical embedding medium is rotated, these rollers rotate opposite to the supporting element. The rollers can be fashioned as glass cylinders, for example, so as to ensure that a transmitted-light contrast method, i.e., an illumination from below, can be carried out. However, a coating with Teflon or other materials is also possible.

When the embedding medium is cylindrical, the entire horizontal holder can also be formed of rollers of this kind which are then driven in a corresponding manner to rotate the sample. They can be fixedly mounted in the sample chamber.

In another construction of the invention, the horizontal holder encloses the embedding medium substantially completely, but has at least one cutout through which the sample is illuminated and light coming from the sample is detected. When the horizontal holder is made of glass or some other transparent material, the cutout may possibly also be omitted. When the horizontal holder encloses the embedding medium in this way, the embedding medium need not necessarily be symmetrical with respect to rotation. Insofar as the embedding medium is completely enclosed, the material used for a transparent horizontal holder should have an index of refraction that is substantially identical to the index of refraction of the surrounding immersion medium. If opaque materials are chosen, the horizontal holder must have a cutout where the sample is located in the embedding medium when the latter is inserted into the holder so that the sample can be illuminated and light coming from the sample can be detected.

The rotation of the sample can be realized in that the gel cylinder is coupled directly or indirectly with a drive which sets the gel cylinder in rotation without the horizontal holder being rotated. However, it is more advantageous for reasons of stability to let the horizontal holder with the gel cylinder contained therein rotate. Therefore, the means for rotation of the sample advisably comprise a rotary drive for rotating the horizontal holder. A rotary drive of this type can be realized in different ways.

In a simple construction of the invention, the rotary drive and horizontal holder are connected by a direct coupling. In this embodiment, openings are cut into a wall of the sample chamber, the drive being guided through these openings. The sample chamber must then be sealed at this location by a seal in a corresponding manner.

In another embodiment, the means for rotation of the sample have a rotary belt drive and/or rotary gearwheel drive. The drive is arranged above the chamber and connected to the horizontal holder by belts or gearwheels through the top opening of the chamber. In this connection, it must be ensured that the mechanism is not impaired in any way by the liquid. The manner of operation is the same as with the direct drive; that is, accurate positioning is made possible. However, the drive avoids the use of seals and, moreover, the sample is easily accessible from the top.

In another preferred construction, the means for rotation of the sample have a magnetic coupling for coupling the horizontal holder and rotary drive through a wall of the sample chamber. This construction can dispense with an opening in the sample chamber with a seal and a complicated mechanism such as that of the mechanical drive. The drive on the outer side of the sample chamber is provided with a magnet; a similar magnet with oppositely oriented poles is fastened to the horizontal holder. Whenever the motor and the drive rotate, the horizontal holder rotates along in a corresponding manner. The two magnets are separated only by the wall of the sample chamber, for example, by the underside of a cuboid sample chamber or cylindrical sample chamber.

This embodiment can advisably be supplemented in that the means for translation have a translating drive which also transmits the translating movement to the holder by means of the magnet coupling. This makes possible at least translating movements in the chamber in a plane. A motor block with the rotary drive can be moved, for example, by the translating drive. It is also possible to accommodate both drives in one unit.

When the rotary drive and horizontal holder are connected by direct coupling, the means for translation of the sample are advantageously a translating holder which at least partially encloses the horizontal holder and which is coupled with a translating drive by a direct coupling. Translation at least in one direction, namely the direction of the axis of rotation, can be realized by means of a direct drive of this kind. When the openings in the wall of the sample chamber and the seals are formed in a corresponding manner, movement in the other spatial directions can also be realized at least to a limited extent.

When the entire chamber is moved in translation, for example, on a stage, there is a risk when using immersion media and when moving in the direction of the illumination beam path that the optical path length measured between the final optical element of the illumination beam path and the intersection between the illumination axis and detection axis will be inconsistent. This can be disregarded under certain circumstances when using a low-aperture illumination, but in other cases adaptive elements must be used in the illumination beam path to avoid this problem in light sheet illumination. Therefore, in an advantageous embodiment of the invention, the sample chamber has a movable wall which is connected to an illumination objective by a spacer. When the sample chamber moves, the movable wall always remains at the same place because it is connected to the illumination objective by the spacer. The illumination objective is the final element in the illumination beam path. The use of the spacer ensures that the optical path length always remains consistent when the samples move along the illumination direction.

Another alternative consists in moving the sample in the sample chamber itself rather than moving the sample chamber on a specimen stage. In a construction of this kind, the means for rotation of the sample and translation of the sample comprise a mechanical arm which reaches through the top opening into the sample chamber and holds the sample on a horizontal holder therein, with a rotary drive, preferably a belt drive or gearwheel drive for rotating the sample, and a translating drive for translation of the sample in the sample chamber. All of these drives can be integrated in a motor block from which the arm is controlled and moved in a corresponding manner. In this case, the sample can also be changed without any problem because the chamber is easily accessible from the top.

The sample holder described above is designed in such a way that it can be used with a standard microscope, for example, an incident light microscope or transmitted light microscope, with vertical illumination and a vertically arranged detection objective. Only the specimen stage need be slightly modified to receive the sample chamber.

The sample holder according to the invention can also be used in a particularly suitable manner in a microscope with light sheet illumination perpendicular to the optical axis of the detection objective and substantially perpendicular to the axis of rotation, for example, in a single plane illumination microscope (SPIM). But, since it is possible to integrate in standard microscope constructions, other contrast methods and other microscopy methods such as epifluorescence microscopy, single photon laser scanning microscopy or two-photon microscopy can also be applied.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
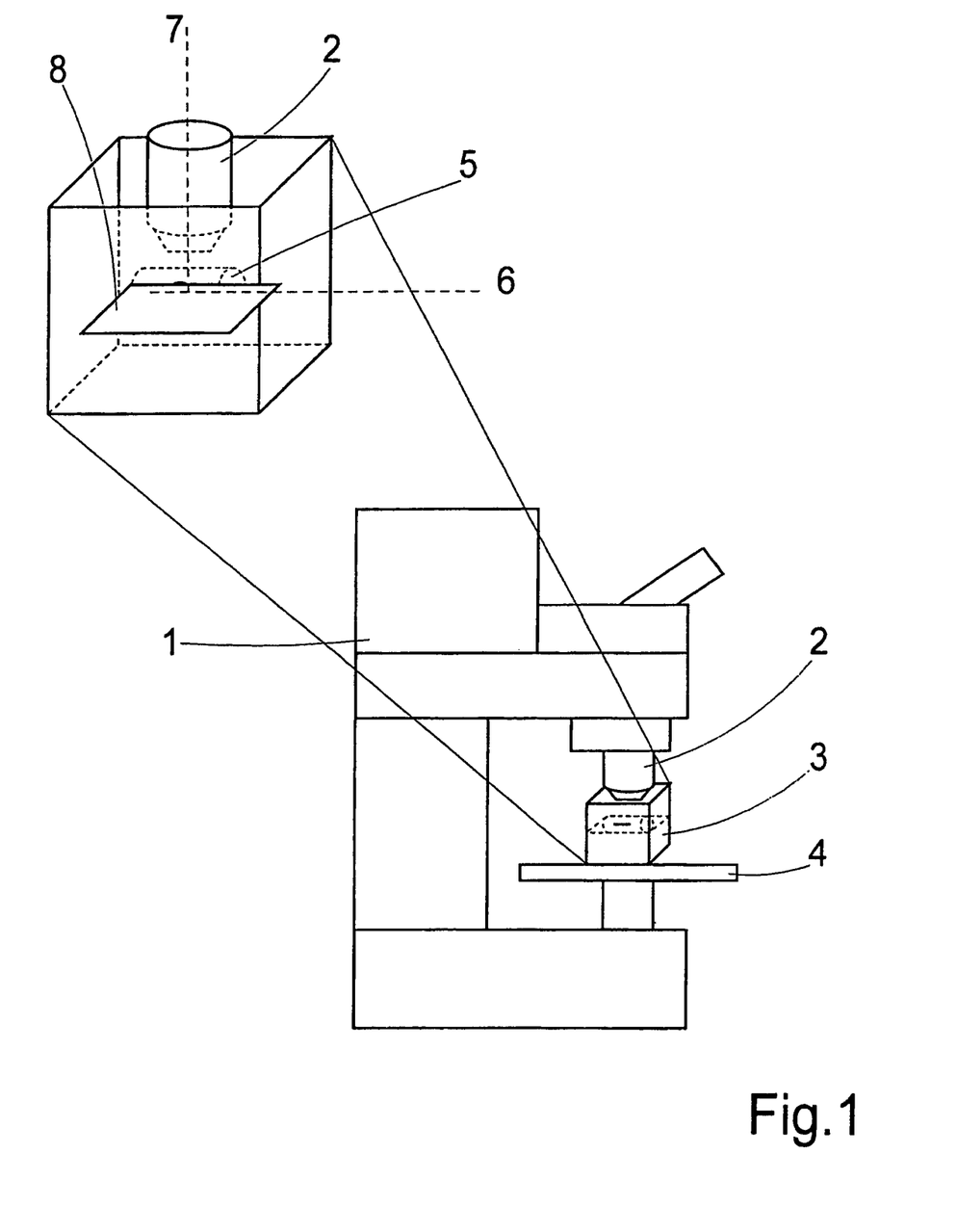
FIG. 1 shows a general diagram of the basic construction of a sample chamber and integration thereof in a microscope.

First, FIG. 1 shows the general construction of a sample holder which is accommodated in a microscope 1. The microscope 1 can be, for example, a standard microscope for incident-light or transmitted-light illumination, but can also be a laser scanning microscope. In particular, the microscope 1 can also be a single plane illumination microscope (SPIM) in which the illumination beam path and detection beam path form an angle other than zero degrees—preferably, as is shown in FIG. 1, an angle of 90°—and the illumination is carried out in an individual plane with a light sheet. The microscope 1 shown in the drawings includes a detection objective 2 which detects light coming from the sample and whose optical axis extends vertically. A sample chamber 3 is arranged in the beam path on a specimen stage 4 which is suitable for holding the sample chamber 3. The microscope 1 is shown from the side and the sample chamber 3 is shown in perspective. The sample chamber 3 is shown in detail above the microscope 1. It is filled with an immersion liquid, for example, water or PBS (phosphate buffered saline) and can be made of glass, Delrin, or some other suitable transparent material. The sample chamber 3 has an upper opening, and the detection objective 2 can, but need not, project into the chamber and into the liquid. Both immersion objectives and standard objectives can be used. A transparent embedding medium in which a sample is embedded is located in the sample chamber 3. When water is used as immersion liquid, the embedding medium can be formed as a gel cylinder 5 comprising a mixture of approximately 98% water and 2% agarose as is in the present example. When other immersion liquids are used, other embedding media are possible. For example, glass cylinders filled with a suitable liquid are also possible. The gel cylinder 5 with the sample can rotate around an axis of rotation 6 which is perpendicular to a detection axis 7 and accordingly extends substantially horizontally referring to FIG. 1. The illumination is carried out perpendicular to the detection axis 7, referring to FIG. 1, in an individual illumination plane 8, wherein the illumination direction also lies perpendicular to the axis of rotation 6. The focus of the detection objective 2 is adjusted to the illumination plane 8.

When using a gel cylinder 5, there is a risk that the cylinder will bend. When the sample is rotated, for example, to generate a three-dimensional image of the sample, this bending could result in that the recorded images do not fit together exactly or that the recordings or measurements are not reproducible. In the worst case, it can also lead to a rupture of the gel cylinder 5 resulting in loss of the sample. The gel cylinder 5 must be suitably supported in order to prevent bending or rupture. FIG. 2a shows a first possibility for a support of this kind. The gel cylinder 5 with a sample 9 is held by a horizontal holder 10 which is preferably tubular. The horizontal holder 10 receives the embedded sample 9. The gel cylinder 5 is fixed in the horizontal holder 10. The horizontal holder is supported in such a way that it can rotate around the axis of rotation of the gel cylinder 5 as is indicated by the curved arrow in the drawing. The horizontal holder 10 can be made of transparent material which then preferably has the same refractive index as the surrounding liquid. The horizontal holder 10 in FIG. 2a comprises two parts which are connected to webs 11 so that the horizontal holder 10 does not completely surround the sample 9 but has, approximately in the center, a cutout 12 through which the sample 9 can be illuminated and through which light coming from the sample 9 can be detected. The cutout can also be located at another place along the horizontal holder 10. The horizontal holder 10 shown in FIG. 2a can be designed so as to be connected to the sample chamber by two points on its circumference and, in case the sample chamber is a cube, at two opposite sides, for example. The two parts of the horizontal holder 10 can be fixedly connected. In this case, the gel cylinder 5 is inserted through an opening at the top or bottom into the tubular horizontal holder 10. Alternatively, two parts can also be detachably connected by the webs by means of screws, etc.

The entire horizontal holder 10—i.e., with both parts—is supported so as to be rotatable. When it is set in rotation, the gel cylinder 5 rotates along with it. Another construction of a horizontal holder 10 is shown in FIG. 2b. In this case also, the horizontal holder 10 comprises two parts which can be held at opposite sides of the sample chamber 3. The two parts have sawtooth-shaped profiles which face one another and by which they engage in one another. For sample preparation, the two sides can be completely slid one inside the other, which facilitates receiving of the gel cylinder 5. Other profiles which carry out the same function can be used in an equivalent manner. For the purpose of measuring and fixing in the sample chamber 3, the two parts are spread apart and locked at two opposite sides of the sample chamber in a corresponding manner. The two sides are not directly connected to one another in this case, but their movement is carried out synchronously. Alternatively, the two parts can also be connected to one another by a suitable locking mechanism. The horizontal holder 10 can then be fixed electively at both sides or only at one side in the sample chamber. Also, the two parts need not necessarily be connected to the sample chamber. It is also possible to support them in other ways inside the sample chamber insofar as the coupling to a drive which sets the gel cylinder 5 and horizontal holder 10 in rotation is ensured. The connection to the sample chamber 3 increases stability on the one hand but also increases expenditure on production.

Figure 2:
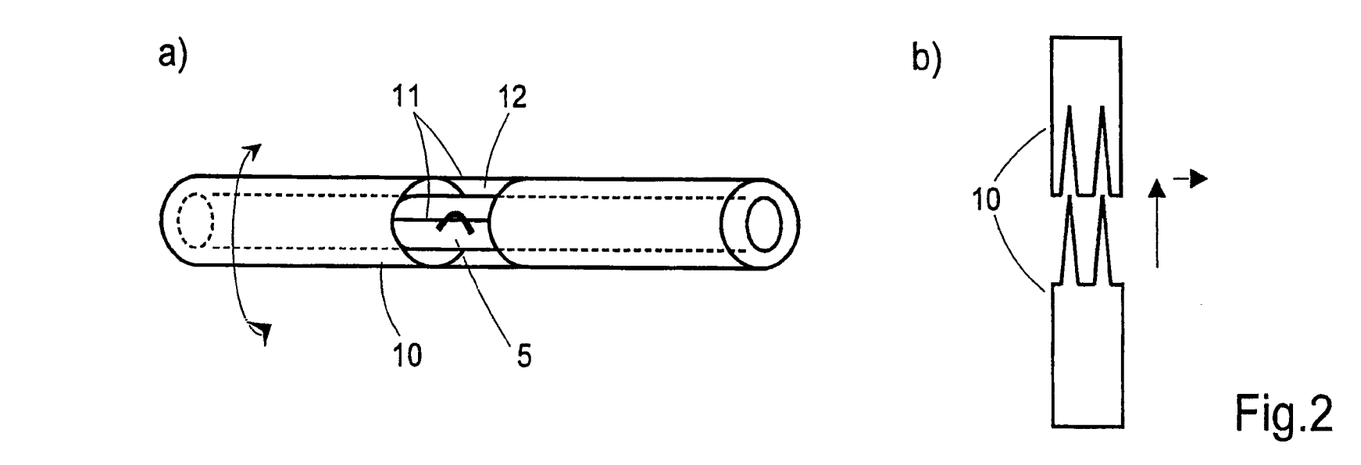
FIGS. 2a-b show a horizontal holder holding the sample by two sides.

While the horizontal holder 10 described in FIG. 2 encloses the sample 9 substantially completely and the sample is rotated along with it, horizontal holders 13 which only partially enclose the embedding medium, particularly the gel cylinder 5, and in which the embedding medium is supported in its unenclosed area on a supporting element 14 which is not also rotated are also possible. An arrangement of this kind is shown by way of example in FIG. 3a. The horizontal holder 13 is tubular and is closed at its end on the left-hand side. The gel cylinder 5 is partially enclosed by the horizontal holder 13. It is held in an unenclosed area by the supporting element 14. This supporting element 14 can have, for example, a contact surface of Teflon on which the embedding medium is supported and on which it can roll. In this connection, a compromise must be found for the extent of the contact surface along the cylinder axis; firstly, as regards preventing bending, for which a surface which is as large as possible is preferable, and, secondly, as regards friction losses, for which purpose the contact surface should be designed so as to be as small as possible. Of course, the illumination and detection of the sample take place in the area of the gel cylinder 5 that is not enclosed. The horizontal holder 13 and supporting element 14 are arranged on a stand 15 which can be positioned in the sample chamber 3. The supporting element 14 does not rotate along with the gel cylinder 5, i.e., no rolling process takes place. The horizontal holder 13 can rotate together with the gel cylinder 5. In this case, the supporting element 14 is connected to the horizontal holder 13 by a coupling, and there is no direct contact between the two. The gel cylinder 5 can also rotate independently from the horizontal holder 13. In this case, it must be coupled with the rotary drive in some other suitable way. The supporting element 14 can then be directly connected to the horizontal holder 13.

As is shown in FIG. 3b, the supporting element 14 can also be constructed of a plurality of rollers 16 on which the gel cylinder 5 with the sample 9 is supported and which rotate opposite to the gel cylinder 5 when the latter is rotated so that a mechanical rolling is possible. The surfaces of these rollers 16 can also be coated with Teflon. Rollers 16 made of glass can also be used. The advantage of glass is that a transmitted illumination from the bottom side—i.e., opposite the direction of gravitational force—is possible. Alternatively, the entire horizontal holder can also comprise a plurality of such rollers, and the gel cylinder 5 is then set in rotation in that the rollers of the horizontal holder are driven in a corresponding manner.

Figure 4:
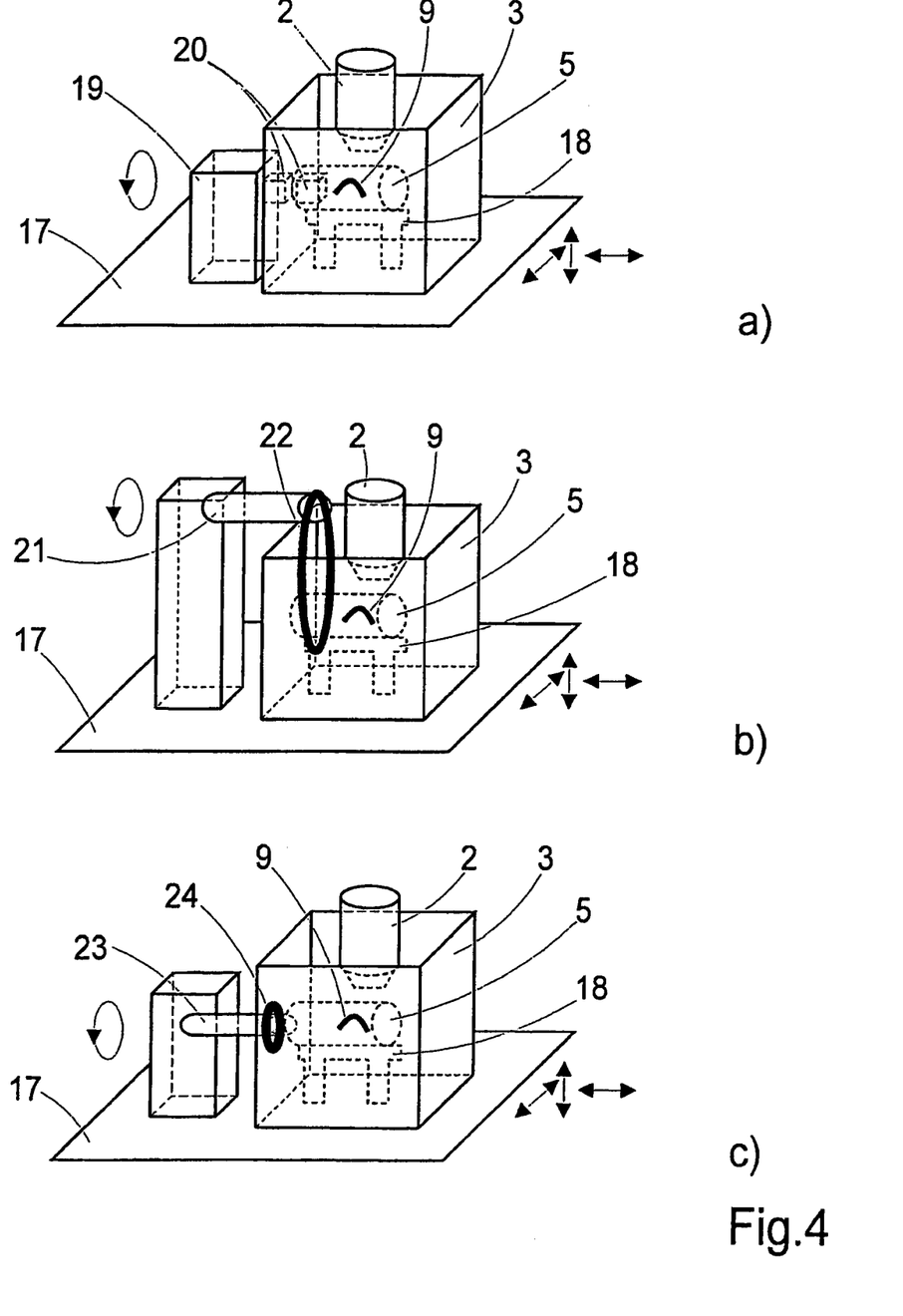
FIGS. 4a-c show different drives for rotating the horizontal holder with the sample.

In order that the sample 9 in the gel cylinder 5 can be rotated, a rotary drive is provided in the sample holder which rotates the gel cylinder 5. Different possibilities for a rotary drive of this kind are shown in FIGS. 4a-c, wherein the gel cylinder 5 is rotated together with the horizontal holder, and the rotary drive together with the sample chamber 3 is fixedly mounted on a specimen stage 17 which is movable in three spatial directions x, Y and Z. The translation of the sample 9 in space is realized in this way. Accordingly, the sample 9 and sample chamber 3 do not move independently from one another. In an advantageous manner in arrangements of this kind, the sample 9 need not be moved in direct translation relative to the medium surrounding it when recording a stack of images. For reasons of stability, this can be advantageous for preventing oscillatory movements of the gel cylinder 5. Another possibility for realizing the recording of an image stack is to move the detection objective 2 and keep the specimen stage 17 stationary. For the sake of simplicity, the horizontal holder is not shown, but its function is symbolized by a support 18. Arranged at the left-hand side next to the sample chamber 3 in FIG. 4a is a rotary drive 19 which is coupled with the horizontal holder through a wall of the sample chamber 3 by means of a magnet coupling at the rotary drive 19. For this purpose, the rotary drive 19 has a magnet 20, a corresponding magnet 20 being arranged at the horizontal holder in a polar opposite manner on the side facing the rotary drive 19. With every rotation of the motor of the rotary drive 19, the horizontal holder and therefore the gel cylinder 5 also rotate correspondingly. In this arrangement, the sample chamber 5 need not be penetrated in order to provide access to a drive. Accordingly, sealing problems are avoided. This applies similarly to the variants shown in FIG. 4b in which the means for rotation of the sample 9 have a rotary belt drive and/or rotary gearwheel drive 21 arranged above the sample chamber 3. The rotary drive 21 shown in FIG. 4b comprises a motor with an arm which projects over the top opening of the sample chamber 3. The outer end of the arm rotates. A belt 22 is fitted to this arm and is connected to the horizontal holder at the same time and sets the latter in rotation in a corresponding manner. For reasons of stability, the belt is preferably made of metal. Alternatively, a gearwheel drive can also be used.

Finally, FIG. 4c shows a third rotary drive 23 which is connected to the horizontal holder by a direct coupling. For this purpose, an opening must be made in the sample chamber 3 which is sealed by means of a seal 24.

Figure 3:
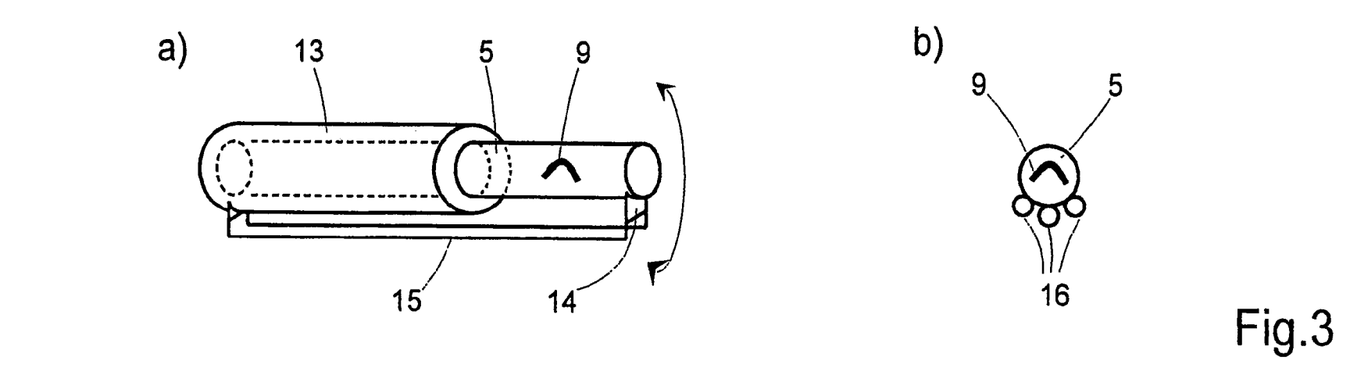
FIG. 3a shows a horizontal holder holding a sample by one side.
FIG. 3b shows a supporting element for supporting the embedding medium.
Figure 5:
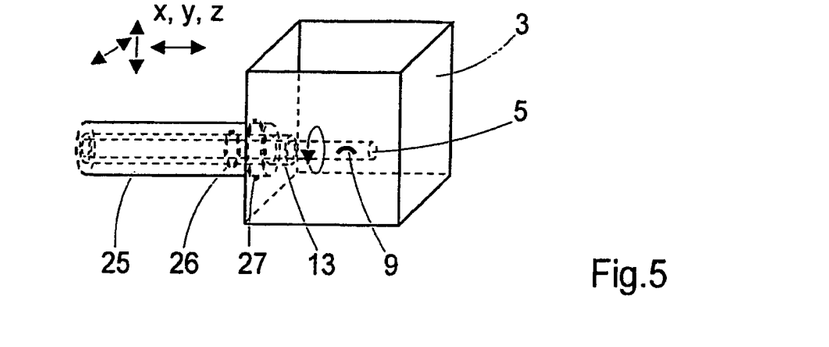
FIG. 5 shows an example of an arrangement for achieving a rotation and translation of the sample without moving the sample chamber.

While the rotary drives 19, 21 or 23 and the sample chamber 3 in the examples described above are fastened to the specimen stage 17, which as a result of translation leads to a joint movement of the sample 9 and sample chamber 3, sample holders in which the sample 9 can be moved independently from the sample chamber 3 are also possible. A sample holder of this kind is shown by way of example in FIG. 5. The gel cylinder 5 with the sample 9 is partially enclosed by a horizontal holder 13 and projects into the sample chamber 3. The horizontal holder 13 is directly coupled with a rotary drive, not shown, by a direct coupling so that the sample 9 can be rotated. The horizontal holder 13 in turn is enclosed at least partially by a translating holder 25 by which a translating movement can be carried out along the three spatial directions. Also, the translating holder 25 is coupled with a corresponding translating drive, not shown. Translation and rotation are achieved by direct couplings of the corresponding holders and their associated drives so that an opening must be made in the side wall of the sample chamber 3 which is cubic in this example. Therefore, two seals 26 and 27 are necessary for sealing the sample chamber: seal 26 seals the horizontal holder 13 relative to the translating holder 25, and seal 27 seals the translating holder 25 relative to the sample chamber 3. Both seals 26 and 27 can be optimized with respect to the type of motion associated with them. In particular, the seal 27 has a basic flexibility which also enables translating movements perpendicular to the direction of the axis of rotation. An elastic foil connecting the translating holder with the sample chamber wall at the point of penetration is suitable for this purpose. Further, the horizontal holder 13 can be provided with a corresponding support according to FIG. 3. Of course, it is also possible to use only one seal. In the arrangement described with reference to FIG. 5, the sample 9 can be moved independently from the sample chamber 3. This can prevent a change in the optical path length of the illumination beam path, which is a considerable advantage when using the sample holder with a SPIM with light sheet illumination, because the illumination need not be adapted in this case.

Figure 6:
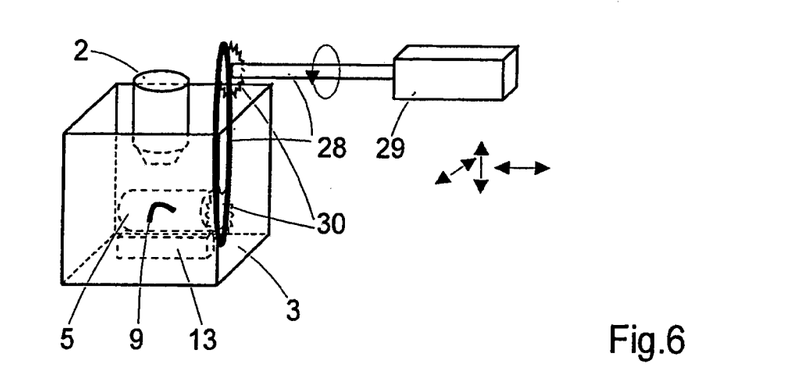
FIG. 6 shows an alternative arrangement for moving the sample in the sample chamber.

The optical path length can also be kept consistent by the sample holder shown in FIG. 6. Further, it has the advantage over the device described in FIG. 5 that translating movements can be carried out in all three spatial directions without special seals. To this end, a mechanical arm 28 is provided which reaches through the top opening into the sample chamber 3 and holds the sample 9 on a horizontal holder 13 which is again only indicated in the drawing. The mechanical arm is connected to a translation/rotation device above the sample chamber 3. The rotational movement is transmitted to the horizontal holder 13 by means of gearwheels 30, this horizontal holder 13 being outfitted with a corresponding arrangement. It is also possible to use horizontal holders which are held at two sides. Alternatively, a belt drive can also be used. In this way, the entire sample arm 28 with the sample 9 can be moved independently from the sample chamber 3 inside the latter. The mechanical arm 28 is preferably designed in such a way that it can sit on the base of the sample chamber with the horizontal holder 13 so that the occurrence of vibrations is substantially suppressed with exclusive rotation of the sample 9.

Figure 7:
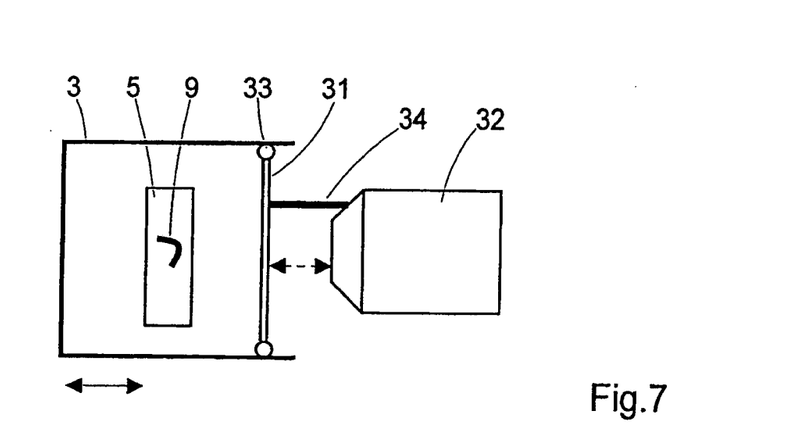
FIG. 7 shows a sample chamber with a movable wall and a spacer for maintaining a consistent optical path length.

Another possibility for keeping the optical path length consistent during translation in one direction consists in that the sample chamber 3 is outfitted with a movable wall 31. A device of this kind is shown in FIG. 7. The drawing shows a top view of the sample chamber 3 along the optical axis of the detection objective. The sample chamber 3 along with the sample 9 supported therein can be moved in the direction indicated by the arrow so as to make it possible to focus on other areas or depths of the sample 9. An illumination objective 32 representing the final optical element in the illumination beam path is shown to the right of the chamber. The movable wall 31 is movable relative to the rest of the chamber, to which end it is provided with seals 33 at its edges. It is connected to the illumination objective 32 by a spacer 34. When the sample chamber 3 is moved along the direction indicated by the double arrow, the movable wall 31 remains in place. The distance between the movable wall 31 and the illumination objective 32 is kept consistent in this way so that the optical path length also does not change.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMBERS 1 microscope
2 detection objective
3 sample chamber
4, 17 specimen stage
5 gel cylinder
6 axis of rotation
7 detection axis
8 illumination plane
9 sample
10, 13 horizontal holder
11 web
12 cutout
14 supporting element
15 stand
16 roller
18 support
19, 21, 23 rotary drive
20 magnet
22 belt
24, 26, 27 seal
25 translating holder
28 mechanical arm
29 translation/rotation drive
30 gearwheel
31 movable wall
32 illumination objective
33 seal
34 spacer

The invention claimed is:

1. A sample holder for a microscope comprising:
a sample chamber which is filled with an immersion liquid and in which a sample is located;
wherein the sample is embedded in a transparent embedding medium having a greater solidity than the immersion liquid; and
wherein the sample chamber includes:
an upper opening;
a means for translating the sample relative to a detection objective of the microscope;
a means for rotating the sample around an axis of rotation extending in a substantially horizontal plane which encloses an angle other than zero degrees with the optical axis of the detection objective; and
a means for horizontally supporting the embedded sample against the effect of gravity;
wherein the means for horizontal support of the sample comprises a horizontal holder which receives the embedded sample;
wherein the horizontal holder partially encloses the embedding medium; and
wherein the embedding medium is supported on a supporting element by the unenclosed area of the embedding medium.

2. The sample holder according to claim 1;
wherein the embedding medium is made of gel.

3. The sample holder according to claim 1;
wherein the means for translation comprises a specimen stage which is movable in space and on which the sample chamber is arranged.

4. The sample holder according to claim 1;
wherein the embedding medium is cylindrical.

5. The sample holder according to claim 1;
wherein the horizontal holder can rotate around the axis of rotation.

6. The sample holder according to claim 1;
wherein the supporting element has a contact surface made of a material with low friction and low adhesion on which the embedding medium is supported.

7. The sample holder according to claim 1;
wherein the supporting element comprises a plurality of rollers on which the embedding medium is supported and which rotate opposite to the embedding medium during the rotation of the embedding medium.

8. The sample holder according to claim 1;
wherein the horizontal holder encloses the embedding medium substantially completely and has at least one cutout through which the sample is illuminated and through which light coming from the sample is detected.

9. The sample holder according to claim 1;
wherein the means for rotation of the sample has a rotary drive for the rotation of the horizontal holder.

10. The sample holder according to claim 9;
wherein the means for rotation of the sample has a magnetic coupling for coupling the horizontal holder and rotary drive through a wall of the sample chamber.

11. The sample holder according to claim 10;
wherein the means for translation has a translating drive which transmits the translating movement to the horizontal holder by means of the magnet coupling.

12. The sample holder according to claim 9;
wherein the means for rotation of the sample has a rotary belt drive and/or rotary gearwheel drive arranged above the sample chamber.

13. The sample holder according to claim 12;
wherein the means for translation of the sample comprises a translating holder which at least partially encloses the horizontal holder and which is coupled with a translating drive by a direct coupling.

14. The sample holder according to claim 9;
wherein the rotary drive and horizontal holder are connected by a direct coupling.

15. The sample holder according to claim 1;
wherein the means for rotation and translation of the sample comprises a mechanical arm which reaches through the top opening into the sample chamber and holds the sample on a horizontal holder therein, with a translating/rotating drive for rotation and translation of the sample in the sample chamber.

16. The sample holder according to claim 1;
wherein the sample holder is used in an incident light microscope or transmitted light microscope with vertical illumination and a vertically arranged detection objective.

17. The sample holder according to claim 1;
wherein the sample holder is used in a microscope with light sheet illumination perpendicular to the optical axis of the detection objective and substantially perpendicular to the axis of rotation.

18. A sample holder for a microscope comprising:
a sample chamber which is filled with an immersion liquid and in which a sample is located;
wherein the sample is embedded in a transparent embedding medium having a greater solidity than the immersion liquid; and
wherein the sample chamber includes:
an upper opening;
a means for translating the sample relative to a detection objective of the microscope;
a means for rotating the sample around an axis of rotation extending in a substantially horizontal plane which encloses an angle other than zero degrees with the optical axis of the detection objective; and a means for horizontally supporting the embedded sample against the effect of gravity; and wherein the sample chamber has a movable wall which is connected to an illumination objective by a spacer.

* * * * *